July 3, 1928.  1,676,233
J. DOROSKI
COMBINED PLANTER AND POTATO DIGGER
Filed Feb. 18, 1927   2 Sheets-Sheet 2
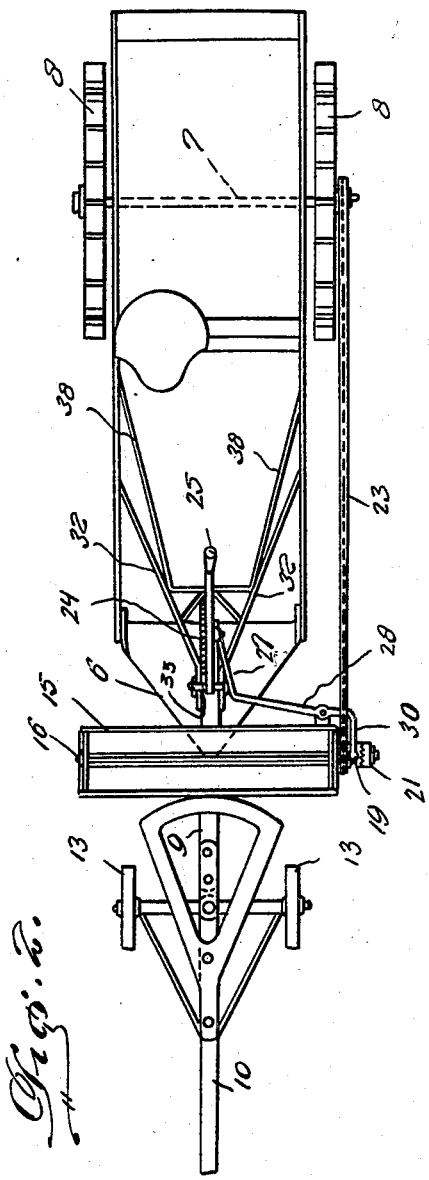
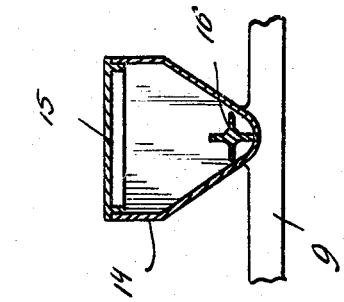
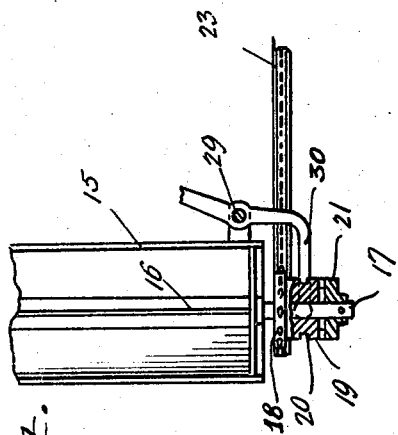
Inventor
John Doroski,
By Clarence A. O'Brien
Attorney Patented July 3, 1928.

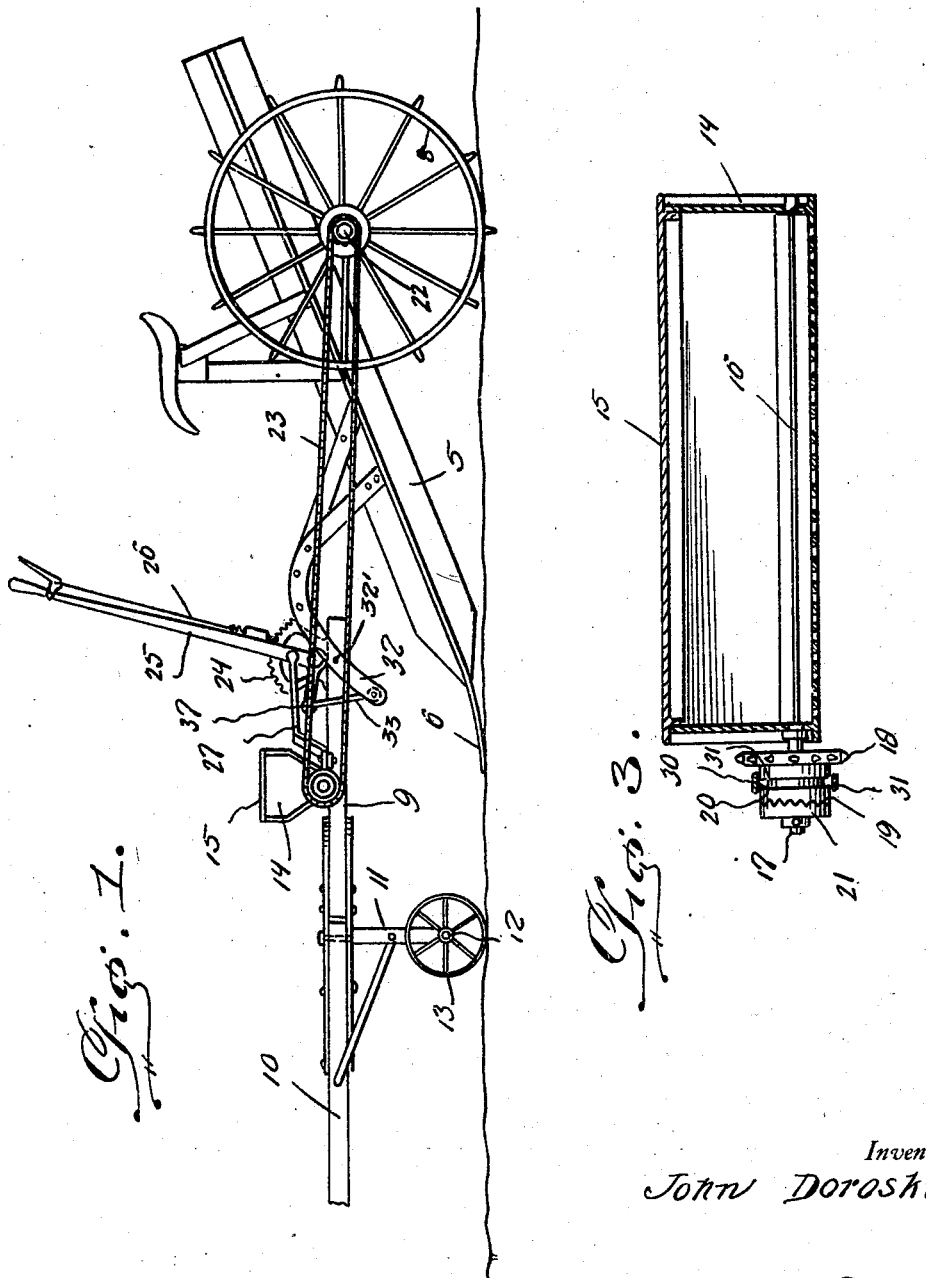

1,676,233

UNITED STATES PATENT OFFICE.

JOHN DOROSKI, OF CALVERTON, NEW YORK.

COMBINED PLANTER AND POTATO DIGGER.

Application filed February 18, 1927. Serial No. 169,303.

This invention relates to new and useful improvements in agricultural machinery, and has particular reference to a combined potato digger and grain seed planter.

The primary object of the invention resides in the provision of a generally conventional design of wheeled potato digger that is equipped with a planting mechanism whereby a planting operation may be performed simultaneously with the potato digging operation for thus reducing the amount of labor usually required in performing the two operations.

A further object of the invention resides in the provision of a machine of this character wherein means is provided for facilitating the raising of the digger and for simultaneously cutting out the operation of the planting mechanism so that the machine may be moved over the ground without the potato digging unit coming into contact therewith and without the discharging of the seed from the planting mechanism.

A final salient object resides in the provision of a combined agricultural machine of this character that is unusually simple of construction, inexpensive of manufacture, and one that may be readily operated for the purposes intended.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts through the several views:

Figure 1 is a side elevation of my improved machine.

Figure 2 is a top plan view thereof.

Figure 3 is a detail enlarged longitudinal section through the seed box.

Figure 4 is an enlarged fragmentary view partly in cross section for more clearly disclosing the clutch mechanism of the planting device operable simultaneously with the raising and lowering of the digger unit, and Figure 5 is a transverse section through the planter box.

Now having particular reference to the drawings, my novel machine consists of a conventional potato digging unit 5 having the usual digging point 6 upon the lower end thereof. This unit being pivotally mounted adjacent its rear end upon an axle 7 upon the outer ends of which are mounted conventional traction wheels 8—8. The device further consists of a horizontal longitudinally extending short draw bar 9 to the forward end of which is pivotally secured in the conventional manner a draft tongue 10, supported by the usual depending bolster 11 that carries an axle 12 upon the ends of which are mounted front supporting wheels 13—13.

Mounted upon the draw bar 9 is a transverse seed box 14 open at its top side and within which is normally disposed a lid 15. This box is adapted to be filled with small seeds such as for instance grain mixed with a suitable amount of soil.

The major area of the side walls of this box are of converging relation, the point of mergence thereof being of rounded contour as disclosed in Figure 5, and formed with seed discharge openings as clearly disclosed in Figure 3. Suitably journaled through the seed box 14 directly above the bottom thereof is a rotary agitator 16 one end of which extends through the box for providing a stub shaft 17. Freely arranged upon this stub shaft 17 is a sprocket gear 18 having a clutch collar 19 at the outer surface thereof which collar is formed with a circumferential channel 20. Keyed to the end of the stub shaft 17 is a clutch unit 21 so that when the clutch collar 19 is moved into engagement therewith the sprocket gear 18 will be keyed to the shaft.

The end of the axle 7 of the machine on the side on which the gear 18 of the planting mechanism is located is equipped with a small sprocket gear 22 over which is trained an endless chain 23 that extends forwardly and is in turn trained over the sprocket gear 18.

Rigidly secured to the draw bar 9 in back of the planter box 14 is a toothed segment 24 to the bottom of which is pivotally secured a vertical hand lever 25 carrying the usual spring detent 26 for engagement with the teeth of the segment to maintain the lever at predetermined set position.

Pivotally secured to the lever 25 adjacent its lower pivotal end is a forwardly extending arm 27 that is preferably formed integrally with the adjacent end of a horizontally disposed bell crank 28 pivoted as at 29 to the back of the planter box 14 directly adjacent the sprocket gear carrying end as more clearly disclosed in Figure 4. The outer arm of this bell crank 28 extends forwardly and is formed with a yoke 30 for engagement over the clutch collar 19 of the sprocket gear 18 and the arms of which are formed with inwardly projecting pins 31—31 for engagement within the channel 20 of said clutch collar. Obviously, a movement of the lever 25 in a rearward direction will so swing the bell crank 28 upon its pivot as to cause the inward movement of the gear 18 and clutch collar 19 so as to free the same from the clutch unit 21.

Rigidly secured to the potato digging unit 5 at opposite sides thereof are the converging goose necks 32—32, the ends of which extend inwardly beyond the adjacent end of the draw bar 9, and to which ends are secured the ends of a U-shaped hanger 33 that extends above the draw bar 9 and that is connected to a forwardly extending short arm 37 formed upon the lower end of the hand lever 25. Preferably, though not necessarily the goose necks 32—32 are braced to the digging unit 5 by joined metal straps 38—38. The goose necks 32—32 are connected to the rear end portion of the draw bar 9 as illustrated at 32' for the purpose of preventing any possibility of a buckling action taking place.

It will thus be seen that when it is desired to raise the digging unit 5 it is only necessary to draw rearwardly upon the hand lever 25 which will simultaneously cause the actuation of the bell crank 28 to move the clutch collar 19 away from the clutch unit 21 for cutting out the operation of the planting mechanism. It will be understood of course that the ground or soil has been worked or dug up by the digging point 6 of the potato digging unit 5 to unearth the potatoes, and this uplifted soil will cover the seed planted by the operation of the dispenser or agitator 16 when coupled to the axle operated shaft 17 by properly actuating the clutch members. As the small seeds fall into the loose soil they will be covered thereby, and by the soil mixed with the seeds in the box. The few seeds still remaining uncovered may also be covered by the person following the machine for collecting the potatoes dug up.

In view of the foregoing description when considered in conjunction with the accompanying drawing it is believed that the operation and advantages of a device of this character will at once be appreciated by those skilled in the art, and even though I have herein shown and described the invention as consisting of certain detail structural elements it is nevertheless to be understood that some changes may be made therein without affecting the spirit and scope of the appended claim.

Having thus described the invention, what I claim is:—

In a combined potato digger and grain seed planter, a wheel supported axle, a potato digging unit mounted upon the axle and adapted for vertical swinging movement, a wheel supported frame arranged forwardly of and above the digging unit, a planting mechanism arranged upon the frame and including driven means for causing the discharge of the grain seed in advance of the uplifting of the soil by said digging unit, a driving connection between said driven means and the wheel axle, a lever pivoted at its lower end portion on said wheel supported frame, means for operatively connecting the pivoted end of the lever with the digging unit at the forward end thereof for raising and lowering the digging unit, and additional means for operatively connecting the lever with the aforesaid driven means to effect a simultaneous operation of said driven means with the actuation of the raising and lowering of the digging unit, said first mentioned means comprising a pair of converging goose necks secured at their lower diverging ends to the digging unit, a U-shaped hanger connected to the converging ends of the goose necks, and a laterally extending arm formed on the lower end of the lever and to which the crown portion of said U-shaped hanger is attached.

In testimony whereof I affix my signature.

JOHN DOROSKI.